Dec. 13, 1966 T. D. WHITENACK, JR., ETAL 3,290,709
AUTOMATIC LIP FOR POWER OPERATED LOADING PLATFORM
Filed Nov. 17, 1964 5 Sheets-Sheet 2

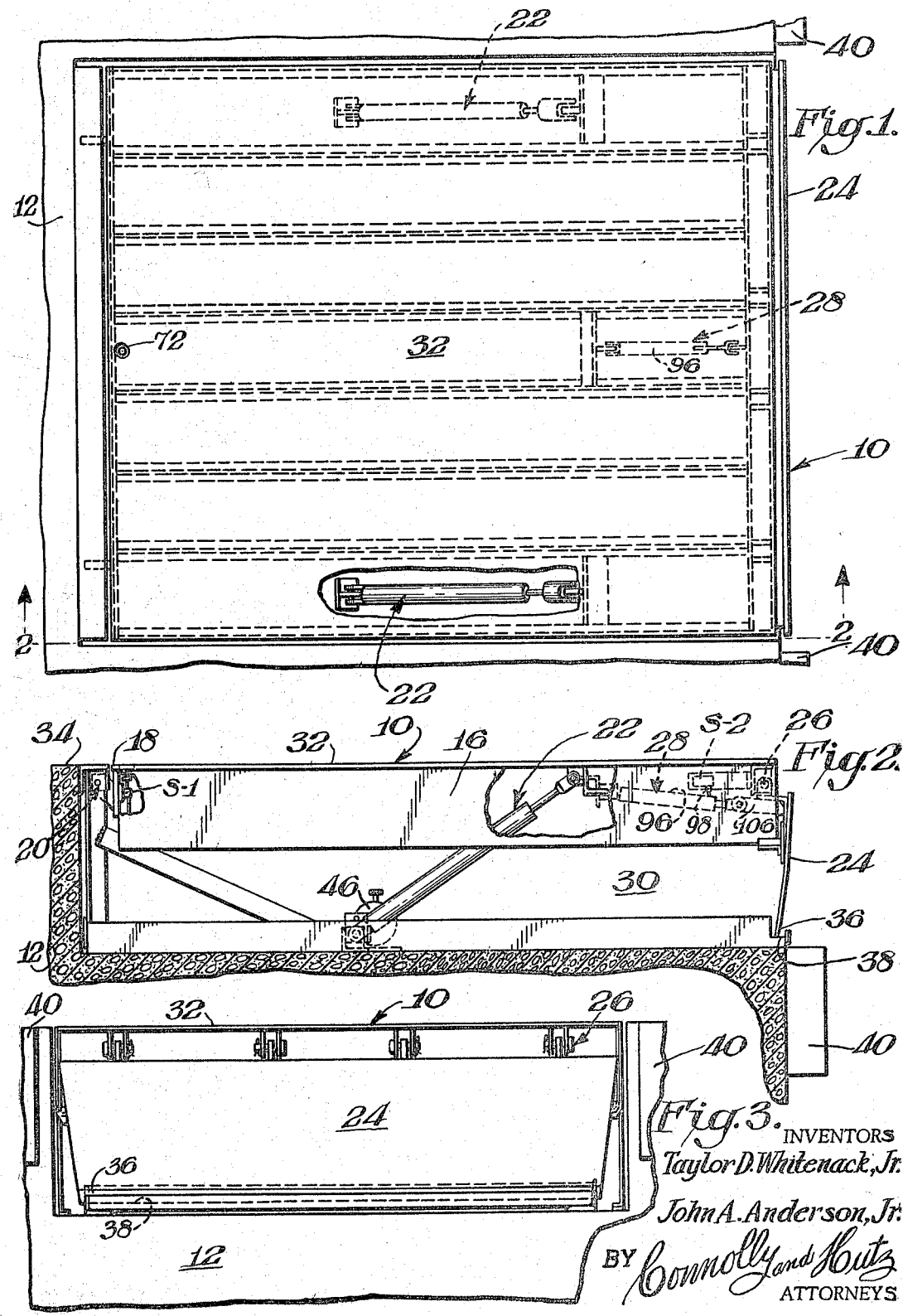

INVENTORS
Taylor D. Whitenack, Jr.
John A. Anderson, Jr.
BY Connolly and Hutz
ATTORNEYS

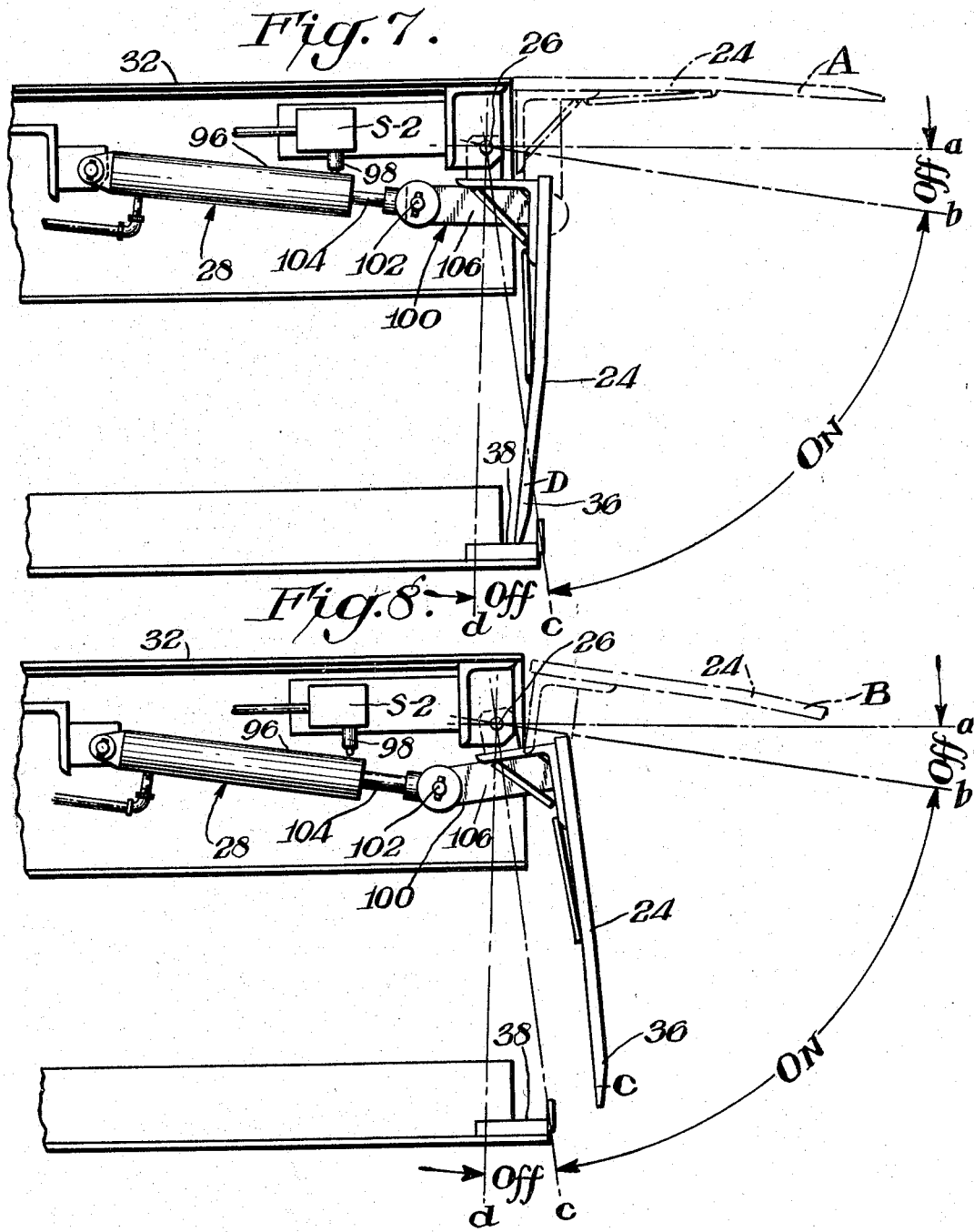

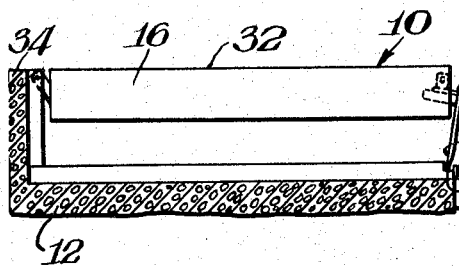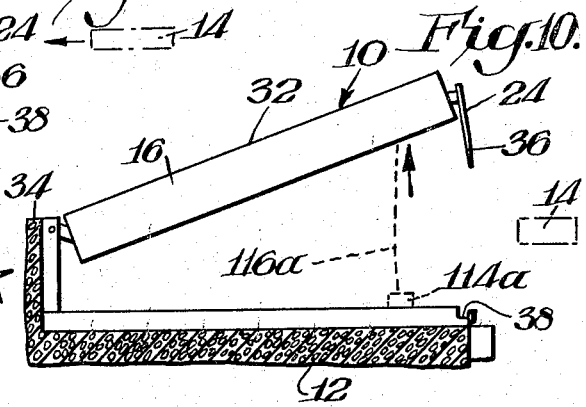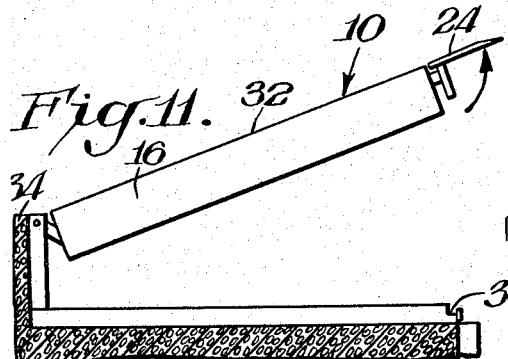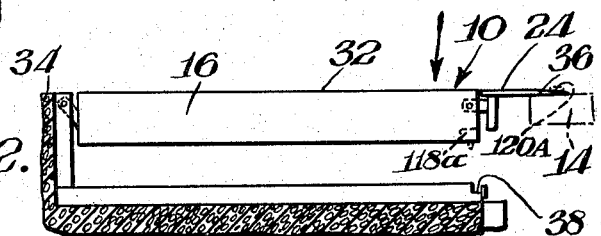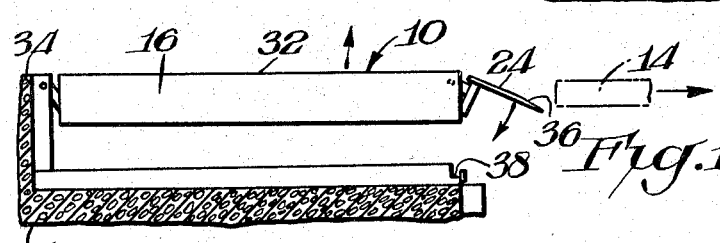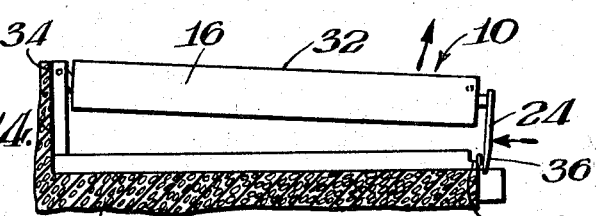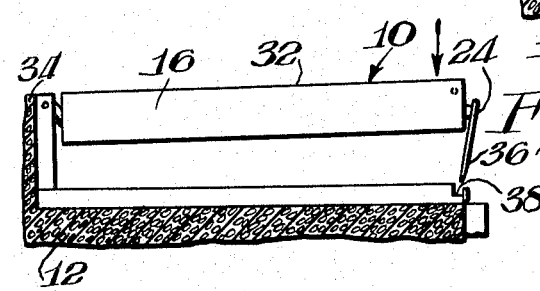

United States Patent Office 3,290,709
Patented Dec. 13, 1966

1

3,290,709
AUTOMATIC LIP FOR POWER OPERATED
LOADING PLATFORM
Taylor D. Whitenack, Jr., and John A. Anderson, Jr.,
Fort Wayne, Ind., assignors to Symington Wayne Corporation, Salisbury, Md., a corporation of Maryland
Filed Nov. 17, 1964, Ser. No. 411,888
20 Claims. (Cl. 14—71)

This invention relates to an automatic fluid power operated lip for a loading platform, and it more particularly relates to such a lip for a hinged loading dock board.

Power operated ramps or dock boards are used for bridging the space between a loading platform and the bed of a vehicle parked adjacent it. Some of these ramps have a hinged lip that stands in a vertical retracted position while the main platform of the ramp lies horizontally flush with the loading dock to permit traffic along the lock to freely cross over it from side to side. The lip is raised to a bridging position to form a continuation of the ramp when it is elevated over and dropped upon an adjacent truck bed. When the truck drives away from under the lip, the ramp falls and the lip drops to the vertical retracted position.

An object of the invention is to provide a simple, economical, efficient and dependable automatic lip operating arrangement for a power transported platform such as a loading dock ramp.

Another object is to provide such an arrangement that is particularly advantageous for a fluid power-operated platform; and A further object is to provide a simple, efficient and dependable automatic power-operated ramp incorporating such a lip operating arrangement.

In accordance with this invention an automatic lip hinged to the front of a power-operated loading dock ramp is power-operated such as by a hydraulic system. The lip operating system is automatically actuated to raise and extend the lip when the ramp is raised above an incoming vehicle and lowered toward it at a controlled rate. The lip is maintained extended throughout the lowering phase of the ramp to cause it to engage an adjacent vehicle bed. The lip sustaining means is inactivated when the ramp lowering phase is completed. This conditions the lip for automatic dropping after the ramp becomes externally supported, such as upon a vehicle or when it fully lowers upon its own bed without contacting a vehicle.

When the ramp and lip are both fluid-power operated, automatic extension of the lip is advantageously actuated by a pressure detecting switch in the ramp operating system whose pressure peaks when the ramp is raised against an upper limit of travel. The operating differential of the pressure switch is great enough to maintain the lip extended until the ramp becomes externally supported. Only then does the pressure in the ramp operating system drop low enough to actuate the pressure switch to drain pressure from the lip operating system and automatically condition it for dropping when the vehicle bed moves out from under it. This prevents the lip from remaining extended unless it is supported upon a vehicle bed and thus prevents it from being exposed to damage from an incoming vehicle. The combination of this feature with a lip-operated switch, that actuates the platform to rise while the lip is dropping, insures that the ramp always returns to the dock level crossover position unless it is supported upon a vehicle bed.

Novel features and advantages of the present invention will become apparent to one skilled in the art from a reading of the following description in conjunction with the accompanying drawings wherein similar reference characters refer to similar parts and in which:

2

FIG. 1 is a top plan view of one embodiment of this invention;

FIG. 2 is a cross-sectional view in elevation taken through FIG. 1 along the line 2—2;

FIG. 3 is a front view in elevation of the embodiment shown in FIGS. 1 and 2;

FIG. 7 is a partial view in elevation of the lip and adjacent portion of the embodiment shown in FIGS. 1-4 and related operating mechanism showing the vertical retracted position of the lip in full outline and the raised bridging position of the lip in phantom outline in conjunction with a control switch and its operating diagram;

FIG. 8 is a view similar to FIG. 7 showing the lip in full outline in a position adjacent the retracted vertical position and in phantom outline in a position adjacent the horizontal bridging position in conjunction with a control switch and its operating diagram; and FIGS. 9-15 are schematic views in elevation showing operating positions of the embodiment shown in FIGS. 1-6 and parts thereof throughout a normal cycle of operation.

Figure 4:
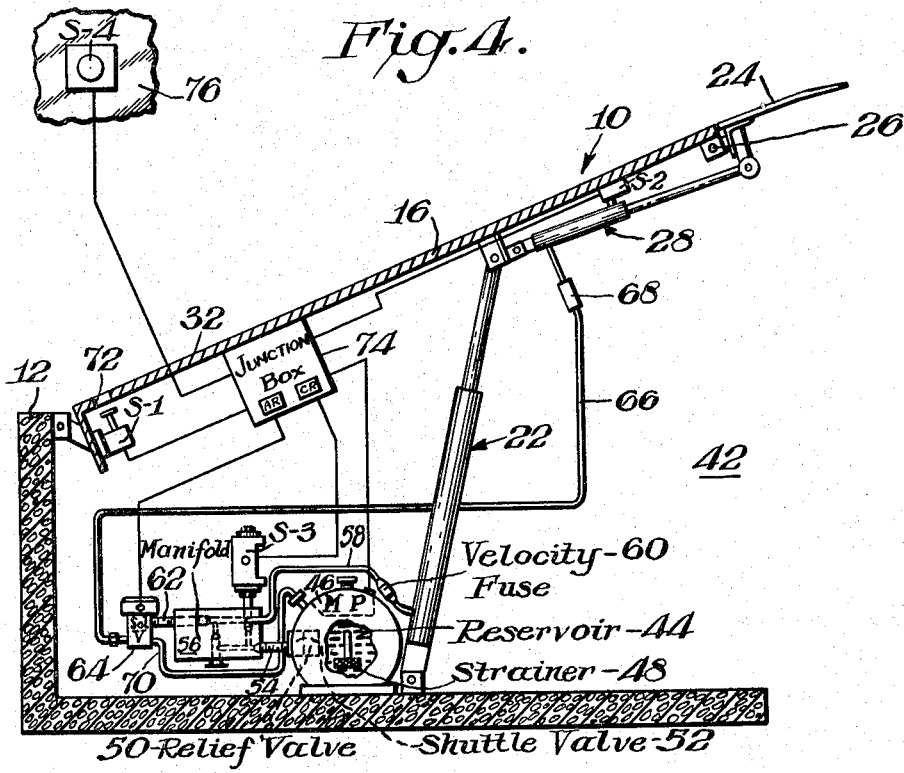
FIG. 4 is a diagrammatic cross-sectional view in operation of the embodiment shown in FIGS. 1-3 in a raised position.

In FIGS. 1-3 is shown a power-operated ramp 10 for bridging the space between a loading dock 12 and a vehicle bed 14 shown in FIGS. 9-13 parked adjacent to dock 12. Ramp 10 includes a platform 16 whose rear end 18 is connected to dock 12 by main hinge 20. A pair of main operating cylinders 22 react between loading dock 12 and platform 16 to provide powered elevating means for rotating platform 16 upwardly about main hinge 20. Lip 24 is connected to the front of platform 16 by lip hinge 26 for movement between the substantially vertical retracted position shown in FIG. 2 to a bridging position in which it forms a substantial continuation of platform 16 as shown in FIGS. 4, 11 and 12. A lip operating cylinder 28 reacts between platform 16 and lip 24 to provide a fluid-powered lip actuating means for raising lip 24 from the vertical retracted to the bridging position.

Ramp 10 is mounted within a rectangular pit 30 in the front of dock 12, and in the crossover position shown in FIGS. 1-3 upper deck 32 of platform 16 lies horizontally flush with the main upper surface 34 of loading dock 12 to permit traffic along the dock to freely cross over platform 16 from side to side. In this crossover condition lip 24 is retracted to a substantially vertical position with its tip 36 resting within crossover slot 38 at the front of pit 30. This causes lip 24 to help support the weight of platform 16 in the crossover position. Bumper blocks 40 are mounted on the front of loading dock 12 on both sides of ramp 10 to prevent an incoming vehicle from bumping into retracted lip 24.

Figure 5:
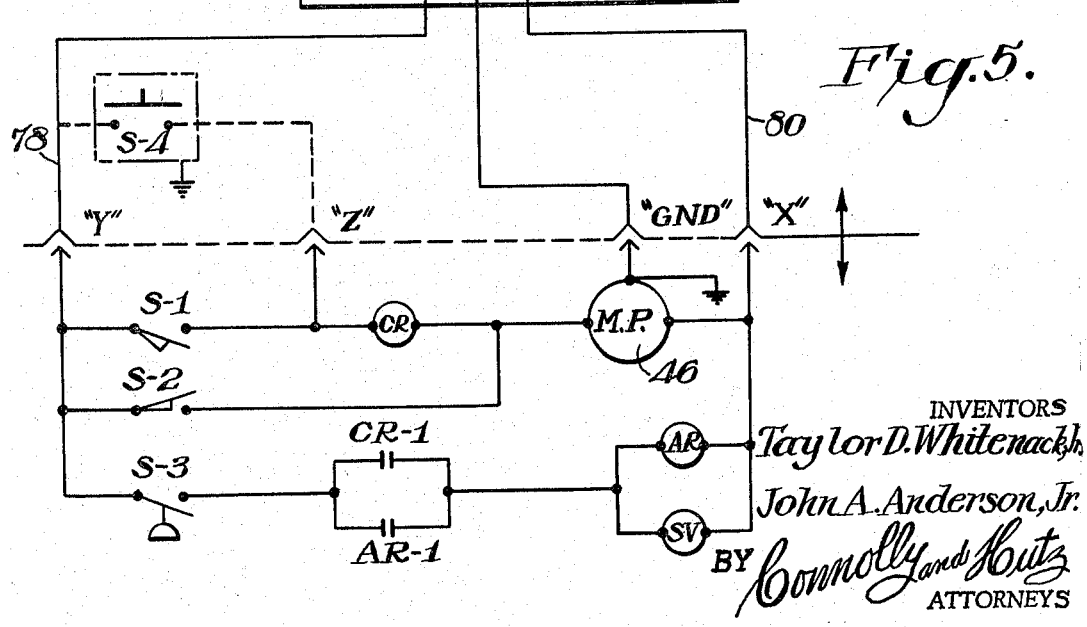
FIG. 5 is a schematic diagram of the electrical system of the embodiment shown in FIGS. 1-4.
Figure 6:
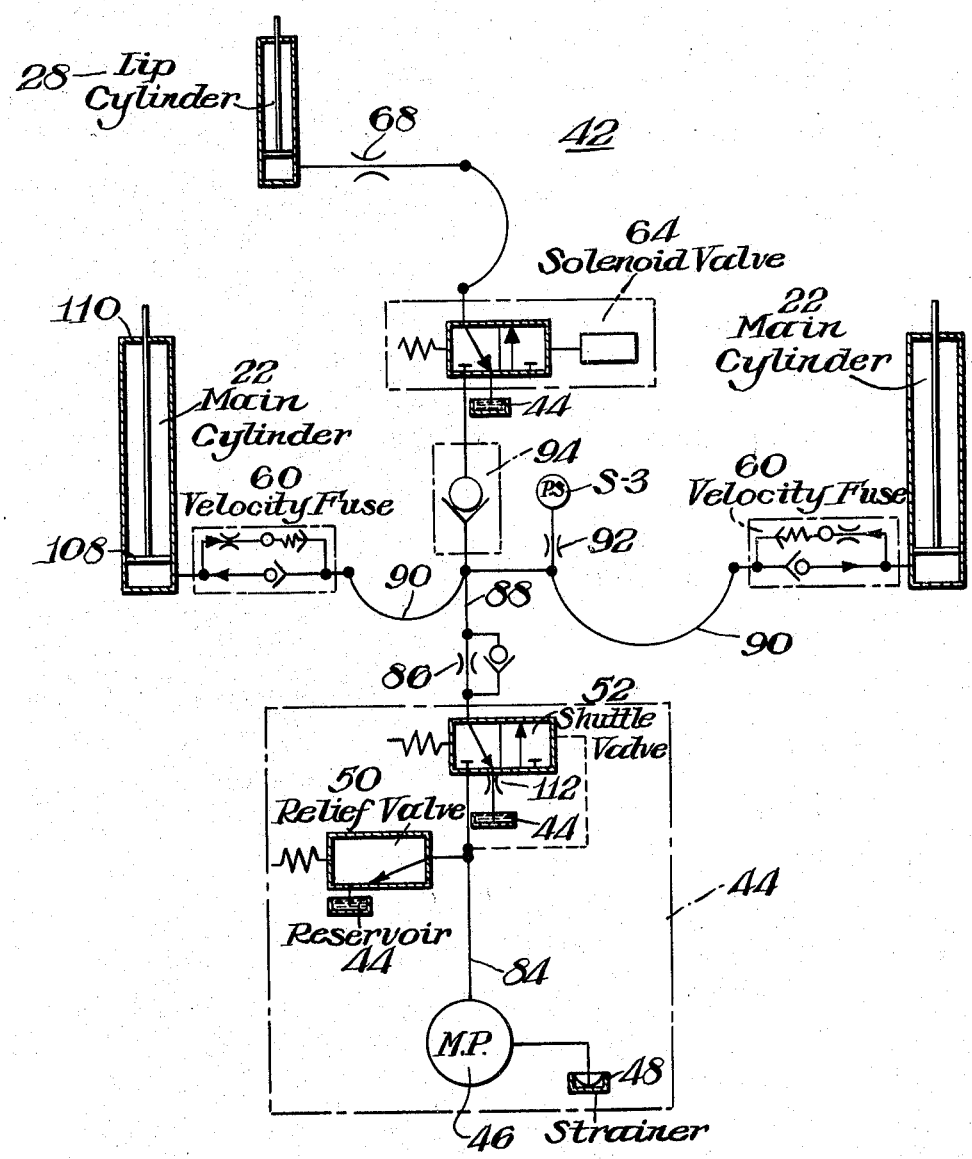
FIG. 6 is a schematic diagram of the hydraulic system of the embodiment shown in FIGS. 1-4.

Diagrams of mechanical, electrical and hydraulic operating aspects of ramp 10 are shown in FIGS. 4-6. FIG. 4 generally describes the physical disposition of operating aspects of ramp 10 and the parts that are operated. As previously described, platform 16 is raised and lowered through hydraulic operating cylinders 22, and lip 24 is raised and lowered through lip actuating hydraulic operating cylinder 28. Hydraulic system 42 (later fully described in conjunction with FIG. 6) includes reservoir 44 within which motorized pump 46 and strainer 48 are conveniently mounted. Pump 46 discharges through shuttle valve 52 and tube 54 to manifold block 56. Block 56 is connected to main operating cylinder 22 by tube 58 within which velocity fuse 60 later described is inserted. Tube 62 connects manifold 56 with the supply side of solenoid valve 64 which is connected by tube 66 to lip operating cylinder 28. Restriction 68 in tube 66 controls the flow of hydraulic fluid to and from cylinder 28. The return side of solenoid valve 64 is connected through tube 70 to drain back into reservoir 44. Hydraulic system 42 is later fully described in conjunction with FIG. 6.

FIG. 4 shows the physical positions of various electrical components associated with ramp 10, which are also shown connected in circuit in FIG. 5. Switch S–1, reached through hole 72 in deck 32 of platform 16, is connected to junction box 74 for actuating starting and stopping of motorized pump 46. A remote switch S–4 is similarly connected for actuating the ramp from a remote position, such as upon a wall 76 adjacent loading dock 12. Junction box 74 is mounted under deck 32 of platform 16, and it also includes relays AR and CR later described in conjunction with FIG. 5. Junction box 74 is also connected to the electrical portions SV of solenoid valve 64, pressure detecting switch S–3, motorized pump 46 and lip-operated switch S–2.

FIG. 5 shows the circuit connections of the various electrical components. Main power lines 78 and 80 are connected to opposite sides of single phase 115-volt, 60-cycle power source 82. Motorized pump 46 is connected between lines 78 and 80 primarily through switch S–1 and optional wall switch S–4 through relay CR. Relay CR closes contact CR–1 to energize holding relay AR that closes its contact AR–1 to maintain solenoid coil SV in solenoid valve 64 energized as long as the pressure detected by pressure switch S–3 is above the predetermined operating minimum of 50 p.s.i. as later discussed in detail. Lip-operated switch S–2 is connected to energize motorized pump 46 without energizing relay CR. Pressurized fluid can then only be directed to main operating cylinders 22 to raise platform 16, and solenoid valve 64 cannot be energized to raise lip 24 because holding relay AR cannot be energized while contact CR–1 remains open. This makes it impossible for lip 24 to be raised unless one of main operating switches S–1 or S–4 is depressed. This pertains even if a substantial load remains on platform 16 that builds up a pressure in hydraulic system 42 over the peak pressure of 500 p.s.i. that operates pressure switch S–3 at the upper end of its operating differential.

FIG. 6 shows the complete hydraulic system 42. The lines of connection are diagrammatic and therefore cannot exactly correlate with the physical tubes shown in FIG. 4. They are therefore differently numbered. Motorized pump 46 is connected through line 84 to shuttle valve 52. Relief valve 50 bypasses to reservoir 44 whenever relief system pressure, for example slightly above 500 p.s.i., is exceeded. Shuttle valve 52 is automatically actuated by pressure in line 84 to close the connection to drain and to pump straight through to the operating system shown above it. It is shown in FIG. 6 in the drain condition. Combination orifice and check valve 86 is connected in line 88 to allow full flow from the pump to the system and only a restricted rate of draining back to reservoir 44. Flexible lines 90 connect the main pressure to main operating cylinders 22 which raise platform 16. Velocity fuses 60 are connected within lines 90 to allow a full flow of pressure to operate cylinder and piston assembly 22 and a restricted flow backwardly to drain through restriction 86 and shuttle valve 52 up to a certain maximum velocity. Velocity fuses 60 are for example of the type described in U.S. Patent 2,821,209 in which the fuses jam shut if the rate of flow back through them exceeds a predetermined maximum rate. This jamming or locking of the fuses is caused if a weight is left on the platform sufficient to cause it to drop at an excessive speed when it is left unsupported. This might happen if a truck should pull out from under the platform as shown in FIG. 13 when a fork-lift truck remains on the platform.

Pressure switch S–3 is connected to system 42 at line 90 through orifice 92 which absorbs abrupt changes in pressure. Pressure switch S–3 is connected as shown in FIG. 5 to energize solenoid valve 64 between upper and lower ends of its operating differential. The upper end of the operating differential is relief valve bypass setting that provides a peak system operating pressure that indicates that platform 16 is fully raised, such as 500 p.s.i. The lower end of the operating differential of switch S–3 is that which indicates that platform 16 is externally supported, such as 50 p.s.i. The characteristics of the operating differential are later described in detail.

Either of main operating switches S–1 or S–4 energizes the solenoid SV of valve 64 to shift it from the draining position shown in FIG. 6 to the straight through pressure connection that supplies pressure to lip cylinder 28 through check valve 94 and restriction 68. Restriction 68 prevents lip 28 from dropping too fast when it is draining to reservoir 44.

FIGS. 7 and 8 show various operating positions of lip 24 from the bridging position A to substantially vertical retracted crossover position D. Inbetween these positions are shown lip positions B and C slightly displaced from the bridging and vertical.

Lip-operated switch S–2 is also shown in FIGS. 7 and 8 together with lip operating cylinder 28. The upper surface 96 of cylinder 28 is associated with actuating stem of switch S–2 in a manner that actuates switch S–2 only when it is displaced from the bridging position A or vertical retracted position D. FIG. 7 accordingly shows that switch S–2 has an operating cycle extending through lines of action $a$, $b$, $c$ and $d$. The letters designating the lines of action correspond in lower case to the positions A, B, C and D. Switch S–2 is energized only through the angle between lines of action $b$ and $c$ and otherwise it is off. FIG. 7 therefore illustrates that switch S–2 is "open" or "off" when lip 24 is in both positions A and D. In these positions upper surface 96 of operating cylinder 28 operatively contacts stem 98. The same relative positions of cylinder 28 and stem 98 are obtained at positions A and B thereby eliminating any necessity for a complex linkage to maintain switch S–2 in the "off" position in either of the extremities of travel of lip 24. This is achieved by arranging linkage 100 from lip operating cylinder 28 to lip 24 about hinge 26 to cause cylinder 28 to assume substantially the same angle of inclination relative to platform 16 in both of lip positions A and D. This is achieved by proper adjustment of operating linkage 100 including pivoted connection 102, piston rod 104 and lip extension 106.

FIG. 8 shows positions B and C of lip 24 corresponding to switch lines of action $b$ and $c$ in which contact of switch S–2 operating stem 98 is just missed by upper surface 96 of cylinder 28. In positions B and C and all positions between them, lip-operated switch S–2 is maintained energized to actuate the raising of platform 16 as later described in detail.

*Operation*

FIGS. 9–15 show various phases of operation of ramp 10, its platform 16 and lip 24. FIG. 9 corresponds to FIG. 2 and shows the horizontal crossover position of ramp 10 in which deck 32 of platform 16 supports crossover traffic along upper surface 34 of loading dock 12 with the ramp 10 supported by engagement of tip 36 of lip 24 in crossover slot 38. At the righthand side of FIG. 9 is schematically shown the bed of a truck 14 moving toward loading dock 12.

When truck 14 is backed adjacent ramp 10 as shown in FIG. 10, ramp 10 is raised to engage it with truck 14 by depressing either of pushbutton switches S–1 or S–4. This starts motorized pump 46 and shifts shuttle valve 52 to direct pressurized fluid to main ramp raising cylinders 22. This raises platform 16 to a predetermined upward inclination shown in FIG. 10 above the vehicle bed. When platform 16 is raised to this predetermined upward inclination against a restraining means (provided by the contact of piston 108 against the upper end 110 of cylinders 22 as shown in FIG. 6), the pressure in system 42 rises to the pump bypass setting of slightly above 500 p.s.i. This is the upper end of the operating differential of pressure switch S-3 which energizes solenoid SV of valve 64 through holding relay AR-1 and thereby directs pressure to lip operating cylinder 28. This raises lip 24 to the bridging position shown in FIG. 11. Check valve 94 then maintains lip operating cylinder 28 pressurized to hold it in the bridging position as long as solenoid valve 64 is maintained shifted by actuating of switch S-3. To drop ramp 10 to engage vehicle 14, the actuated one of pump motor operating switches S-1 and S-4 is released to stop the pump. Shuttle valve 52 then shifts to the drain position to cause the platform to drop at a controlled rate of speed governed by restriction 86 in line 88.

Once that pressure switch S-3 has been actuated at the peak operating pressure of 500 p.s.i., it is maintained actuated until a predetermined lower pressure, for example 50 p.s.i., occurs in system 42. This wide operating differential is employed to associate the controlled sustaining of the lip actuating device with the lowering phase of the ramp. As platform 16 lowers, a pressure in system 42 is maintained even though main operating cylinders 22 are draining to reservoir 44 because of the restriction or orifice 86. Orifice 86 maintains a pressure in system 42 above the predetermined lower switch-operating pressure as long as platform 16 is not externally supported. After platform 16 becomes externally supported by dropping on the bed of a truck 14 or reaching its lower limit of travel, the pressure in system 42 drops below 50 p.s.i., the lower end of the operating differential to which switch S-3 is set. This opens the circuit to solenoid SV of valve 64 to shift valve 64 back to the condition shown in FIG. 6 in which lip operating cylinder 28 is connected to drain to reservoir 44 through orifice 68. This automatically conditions lip 24 to drop to the substantially vertically retracted position after ramp 10 and its lip 24 engage the bed of truck 14 as shown in FIG. 12.

The particularly recited operating pressures at the upper and lower ends of the operating differential of pressure switch S-3 are purely illustrative. The upper end of the differential is correlated and responsive to platform position in that the peak pressure detected is obtained when cylinders 22 top out to cause the pressure in system 42 to approach pump bypass setting, which is for example slightly above 500 p.s.i. The lower end of the operating differential is associated with the lowering phase of the ramp and is some convenient minimum pressure obtained in system 42 that occurs when ramp 10 becomes externally supported. Pressure switch S-3 with a broad operating differential therefore provides a number of control functions. It is a platform position responsive means. It is a sustaining means throughout its operating differential in which the lip operating means is actuated while the ramp is above an external support, and it is a lowering phase associated means in the control device connected to the sustaining means for inactivating it when the ramp is externally supported to condition the lip for dropping to the vertically retracted position after the lowering phase of the ramp is completed. Pressure switch S-3 is advantageously a convenient means for dependably performing these functions as well as being directly correlated to the functions and phases involved.

In FIG. 13, truck 14 is driving out from under lip 24 which immediately starts to drop because of its aforementioned conditioning. As soon as lip 24 drops to positions between B and C (shown in FIGS. 7 and 8) switch S-2 is actuated by withdrawal of surface 96 of cylinder 28 from stem 98 as shown in FIG. 8 to turn motorized pump 46 on and start raising platform 16 as shown by corresponding arrows. The inactivation of main switches S-1 and S-4 prevents holding relay AR from being energized thereby causing lip 24 to drop as rapidly as permitted by orifice 68 to the vertical retracted position shown in FIG. 15 in which it will drop into crossover slot 38 to return ramp 10 to the crossover supported position.

FIG. 14 shows a remotely possible condition in which platform 16 drops so fast that lip 24 cannot drop to a position above crossover slot 38 in time to have its tip 36 fall into it. Lip 24 will then be in an "on" phase as shown in FIGS. 7 and 8, and motorized pump 46 will be operated until platform 16 is raised a sufficient distance to permit lip 24 to drop freely above and into crossover slot 38. In actual practice, the position shown in FIG. 14 is unlikely to occur because platform 16 is usually raised far enough to restore lip 24 by actuation of motorized pump 46 during normal fall of lip 24.

Ramp 10 must always return to the crossover position whenever it is not externally supported upon a truck. Lip 24 cannot be left in the extended position because it is conditioned for dropping by its positive association with the lowering phase of the ramp, and lip-operated switch S-2 raises ramp 16 sufficiently to restore lip 24 to the crossover slot.

A lip-operated switch that is somewhat differently actuated is described in copending, commonly assigned U.S. patent application, Serial No. 237,691, filed November 14, 1962, now Patent No. 3,255,478, issued June 14, 1966, which does not include the advantageous lowering phase associated control system of this invention. The particularly advantageous operating arrangement between lip-operated switch S-2 and lip operating cylinder 28 is described and claimed in copending and commonly assigned U.S. patent application S.N. 411,930, filed November 17, 1964.

This invention also has other advantageous features. There is very little possibility of damage by jamming. If lip 24 should contact a truck body as the ramp rises, the fluid power system resiliently yields therefore avoiding permanent damage that a mechanically operated lip might incur. Velocity fuses 60 prevent platform 16 from dropping at an excessive rate of speed, such as might occur when truck 14 drives out from under it when a fork lift truck remains on platform 16. In that event the fuses will jam and lock the platform until the excess weight is removed.

The various functions of pressure switch S-3 can also be provided by other means. The platform position responsive means may be a limit switch such as 114A optionally indicated in FIG. 10 that is actuated by a cable 116A when the ramp is raised to its predetermined inclination.

The lowering phase associated means can then be limit switches 118A and 120A optionally shown in FIG. 12 at the sides of platform 16 and lip 24 that respectively contact a portion of loading dock 12 or vehicle 14 when ramp 10 becomes externally supported by either of them. Switch 120A must be positioned at the side of lip 24 out of the path of traffic.

Pressure switch S-3 may also be replaced by a time delay switch that maintains lip 24 sustained in the bridging position throughout a period corresponding to the normal full lowering phase of the ramp. It might for example require thirty seconds for the ramp to drop from the fully raised position shown in FIG. 11 to the maximum lowered position against loading dock 12 that might result if lip 24 does not contact a truck. Time delay switch S-3 (not shown but similarly connected to switch S-3) would maintain solenoid valve 64 shifted to the lip cylinder pressurizing position throughout the thirty second period. This conditions the lip for dropping after the normal lowering phase of the ramp is completed. Such a time delay system is satisfactory, but it involves some slight possibility that lip 24 might remain extended and exposed to damage for a few seconds while the ramp is not supported on a truck. Such a system is therefore not quite so foolproof as one including previously described pressure differential switch S–3.

What is claimed is:

1. A power-operated ramp for bridging the space between a loading dock and a vehicle bed adjacent to it comprising a platform, main hinge means connecting the rear of said platform to said loading dock, powered elevating means connected to react between said loading dock and said platform for rotating it upwardly about said main hinge means, a lip disposed at the front of said platform, lip hinge means rotatably connecting said lip to the front of said platform for movement between a substantially vertical retracted position to a bridging position in which it forms a substantial continuation of said platform, powered lip actuating means connected to react between said platform and said lip for raising said lip from said retracted to said bridging position, control means connected to said powered lip actuating means for operating it, platform position responsive means in said control means for operating said powered lip actuating means to raise said lip above said vehicle bed when said platform is raised to a predetermined inclination above said vehicle bed, sustaining means in said control means for maintaining said lip actuating means and said operating lip raised, and ramp lowering phase associated means in said control means connected to said sustaining means for inactivating said sustaining means when said ramp is externally supported for conditioning said lip to drop to said substantially vertical retracted position when said lowering phase of said ramp is completed.

2. A ramp as set forth in claim 1 wherein said platform position responsive means is a limit switch that is actuated when said platform reaches said predetermined inclination.

3. A ramp as set forth in claim 1 wherein said ramp lowering phase associated means comprises support contacting means upon said ramp that is actuated when said ramp becomes externally supported.

4. A ramp as set forth in claim 1 wherein said powered lip actuating means is fluid powered.

5. A ramp as set forth in claim 4 wherein said powered-elevating means is also fluid powered, both of said fluid-powered means comprising drive means, a source of fluid pressure, pressure draining means, a fluid system connecting said source of pressure and said pressure draining means to each of said drive means, valve means in said system between said source of pressure and said pressure draining means and said drive means for controlling their operation, said control means being connected to said valve means, restraining means reacting between said platform and said loading dock for limiting the upward inclination of said platform whereby the pressure in said system is raised to a predetermined peak operating pressure when said platform is elevated to the upper limit of its travel, said platform position responsive and lowering phase associated means comprising a pressure detecting means connected in said system and to actuate said control means, said pressure detecting means being connected to said valve means for causing pressure to be applied to said activating means when it detects said predetermined peak operating pressure for raising said lip when said platform is elevated to said upper limit of travel, said control means being connected to said valve means to cause fluid pressure to be applied to elevate said platform and to drain pressure to lower it to be supported upon said bed of said vehicle whereupon said pressure in said system drops below a predetermined lower pressure, and said pressure detecting means having an operating differential that maintains said lip raised when said pressure in said system is above said predetermined lower pressure and activates said valve means to connect said lip drive means to said drain connection when it detects said predetermined lower pressure in said system whereby said lip is conditioned for dropping to said substantially vertical retracted position when it is left unsupported.

6. A ramp as set forth in claim 5 wherein a restriction is connected in said system between said fluid powered elevating means and the draining means connected to it for maintaining pressure in said system above said predetermined lower operating pressure while said platform is lowering whereby said lip is maintained raised until said lip end of said ramp is supported.

7. A ramp as set forth in claim 5 wherein a restriction is connected in said system between said lip drive and its draining means for controlling the speed of drop of said lip.

8. A ramp as set forth in claim 5 wherein said valve means comprise solenoid valves, said pressure detecting means comprises a pressure detecting switch having an operating differential that operates said solenoid valves to operate said lip drive means at said predetermined peak operating pressure and to inactivate it at said predetermined lower pressure.

9. A ramp as set forth in claim 8 wherein said source of pressure is electric motor driven, said electric motor having a starting circuit, said control means comprising a manually operated switch connected to said electric motor starting circuit, and said switch being connected to start said electric motor for elevating said platform and to stop it for lowering said platform.

10. A ramp as set forth in claim 9 wherein lip position detecting means is connected to said starting circuit for causing said electric motor to operate unless said lip is substantially fully raised or fully lowered whereby said platform is automatically elevated while said lip is dropping to allow said lip to assume said substantially vertical position.

11. A ramp as set forth in claim 10 wherein said control means includes relay means for preventing said valve means between said source of pressure and said lip drive means from being actuated to apply pressure to said lip drive means when said lip position detecting means is operating said motor.

12. A ramp as set forth in claim 8 wherein said sustaining means includes a check valve between said source of pressure and said lip drive means and a solenoid valve between said lip drive means and said pressure drain connection.

13. A ramp as set forth in claim 12 wherein a shuttle valve having a flow through and a drain position is connected between source of pressure and said platform drive means, and said pressure detecting switch being connected between said shuttle valve and said platform drive means for detecting said predetermined high operating pressure when said shuttle valve is in said straight through condition and said electric motor driven pressure source is operating and for detecting said predetermined lower operating pressure when said shuttle valve is in the draining position and said electric motor driven pressure source is inoperative.

14. A ramp as set forth in claim 1 wherein said sustaining and said ramp lowering phase associated means comprise a time delay means that maintains said lip actuating means operating for a period corresponding to the normal full lowering phase of said ramp.

15. A ramp as set forth in claim 14 wherein said powered lip actuating means is fluid powered and comprises a drive means, a source of fluid pressure, pressure draining means, a fluid system connecting said source of pressure and said pressure draining means to said drive means, valve means in said system between said source of pressure and said pressure draining means and said drive means for controlling their operation, said control means being connected to said valve means, said platform position responsive means being connected to said valve means for pressurizing said fluid powered lip actuating means when said ramp is raised to said predetermined inclination, and said valve means including said time delay means that maintains said fluid powered lip actuating means pressurized and said lip extended through said period.

16. A ramp as set forth in claim 15 wherein said valve means is a solenoid operated valve, said platform position responsive means comprises a switch that is actuated when said platform is raised to said predetermined inclination to operate said solenoid operated valve to connect said source of pressure to said fluid powered lip actuating means thereby raising said lip, said time delay means being connected to said solenoid operated valve to maintain said lip actuating system pressurized throughout said normal lowering phase of said platform and thereafter actuating said solenoid operated valve to connect said lip actuating means to said pressure draining means for then conditioning said lip to drop and retract.

17. An automatic lip operating arrangement for a fluid power-transported platform comprising fluid-powered transporting means connected to said platform, a lip disposed at the front of said platform, movable connecting means coupling said lip to an edge of said platform to move through extended and retracted positions, fluid-powered lip actuating means connected to react between said platform and said lip for moving said lip to said extended position in which it forms a substantial continuation of said platform, a source of fluid pressure, a fluid system connecting said source of fluid pressure to said fluid-powered transporting means and to said fluid-powered lip actuating means, valve means in said fluid system for controlling the application to and draining of pressure from said fluid-powered transporting and lip actuating means, restraining means disposed in the path of travel of said platform whereby the pressure in said system is raised to a predetermined peak operating pressure when said platform is operated against said restraining means, control means connected to actuate said valve means, pressure detecting means connected in said system and to actuate said control means, and said control means being arranged to operate said valve means when said predetermined peak operating pressure is detected to apply pressure to said fluid-powered lip actuating means whereby it is automatically extended when said platform is transported against said restraining means.

18. An automatic lip operating arrangement as set forth in claim 17 wherein said fluid transported platform is arranged to move between externally unsupported and supported positions in which the pressure in said fluid is relatively high and low, said pressure detecting means having an operating differential that operates said valve means to apply pressure to extend said lip at said peak pressure and operates said valve means to drain said pressure when the pressure in said system drops below a predetermined minimum, and a draining restriction in said system for maintaining said pressure draining from said system above said predetermined minimum while the weight of said platform is reacting upon said fluid-powered transporting means whereby said lip is maintained extended for a sufficient time to engage an external surface while said platform is moving downwardly from a raised position to which it has been transported and whereby said lip is conditioned for retraction when it is externally supported.

19. An automatic lip as set forth in claim 18 wherein said lip is biased to said retracted position, and said fluid-powered lip actuating means extends said lip against said bias.

20. An automatic lip operating arrangement as set forth in claim 19 wherein said platform and said lip move up and down and both are biased by gravity to lower positions of travel.

References Cited by the Examiner
UNITED STATES PATENTS

| | | | |
|---|---|---|---|
| 2,644,971 | 7/1953 | Rowe | 14—71 |
| 2,714,735 | 8/1955 | Watson | 14—71 |

JACOB L. NACKENOFF, *Primary Examiner.*